United States Patent [19]

Chiang

[11] Patent Number: 6,147,780
[45] Date of Patent: Nov. 14, 2000

[54] SCANNER WHICH TAKES SAMPLES FROM DIFFERENT POSITIONS OF A DOCUMENT TO INCREASE ITS RESOLUTION

[75] Inventor: Te-Ming Chiang, Taipei, Taiwan

[73] Assignee: Primax Electronics Ltd., Taipei Hsien, Taiwan

[21] Appl. No.: 09/062,543

[22] Filed: Apr. 17, 1998

[51] Int. Cl.[7] .................................................. H04N 1/04
[52] U.S. Cl. ........................... 358/497; 358/488; 358/483
[58] Field of Search ..................................... 358/488, 482, 358/483, 487, 474, 497, 486, 471; 359/813; 250/208.1, 234–236

[56] References Cited

U.S. PATENT DOCUMENTS

| | | | |
|---|---|---|---|
| 5,335,091 | 8/1994 | Palum | 358/474 |
| 5,396,142 | 3/1995 | Koblanski | 359/213 |
| 5,432,622 | 7/1995 | Johnston et al. | 358/471 |
| 5,786,901 | 7/1998 | Okada et al. | 358/474 |
| 5,798,875 | 8/1998 | Fortin et al. | 359/813 |

Primary Examiner—Cheukfan Lee
Attorney, Agent, or Firm—Winston Hsu

[57] ABSTRACT

A scanning device which will take samples from different positions to increase its resolution. The scanning device comprises a housing, a scanning module, and a driving device. The housing comprises a transparent platform installed on its top for placing a document. The scanning module is installed inside the housing and is slidable along a front-and-rear direction for scanning the document. The scanning module comprises a carrier, a sensor, and a positioning device for fixing the sensor inside the carrier. The sensor is installed within the carrier, is slidable along a left-right direction and comprises a plurality of linearly arranged sensing units for taking samples from the scanned document. A driving device is used for driving the scanning module forward and backward to scan the document. When the scanning module scans the document along the front-and-rear direction, the positioning device can fix the set of sensing units of the sensor at non-repeating sampling positions inside the carrier to increase the resolution of the sensor.

21 Claims, 11 Drawing Sheets

SCANNER WHICH TAKES SAMPLES FROM DIFFERENT POSITIONS OF A DOCUMENT TO INCREASE ITS RESOLUTION

BACKGROUND OF THE INVENTION

1. Field of the Invention

The present invention relates to a scanner, and more particularly, to a scanner which takes samples from different positions of a document to increase its resolution.

2. Description of the Prior Art

A scanning module of a prior art scanner comprises a set of linearly arranged sampling units for scanning a document. The resolution of such a scanner is determined by the distance between two neighboring sampling units. A smaller distance is associated with a higher resolution. If a user wants to increase the resolution of the scanner, the user has to replace the scanning module by one which has a higher resolution. Because the distance between two neighboring sampling units of a high resolution scanning module is shorter than a low resolution scanning module, and the number of sampling units of a scanning module is proportional to its resolution, it becomes quite expensive to manufacture a high resolution scanning module.

SUMMARY OF THE INVENTION

It is therefore a primary objective of the present invention to provide a scanner which can greatly increase its resolution without increasing the number of sampling units to solve the above mentioned problem.

In a preferred embodiment, the present invention provides a scanning device comprising:
- a housing having a transparent platform installed on its top for placing a document;
- a scanning module installed inside the housing slidable along a front-and-rear direction for scanning the document, the scanning module comprising:
  - a carrier;
  - a sensor installed inside the carrier slidable along a left-and-right direction, the sensor comprising a plurality of sensing units linearly arranged along a left-and-right direction for taking image samples of the document; and
  - a positioning device for fixing the sensor inside the carrier; and
- a driving device for driving the scanning module forward and backward to scan the document;

wherein when the scanning module scans the document along the front-and-rear direction, the positioning device can fix the plurality of sensing units of the sensor at non-repeating sampling positions inside the carrier to increase the resolution of the sensor.

It is an advantage of the present invention that the scanning module takes samples from non-repeating positions of the document so that its resolution is greatly increased and the number of sensing units does not need to be increased.

This and other objectives and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
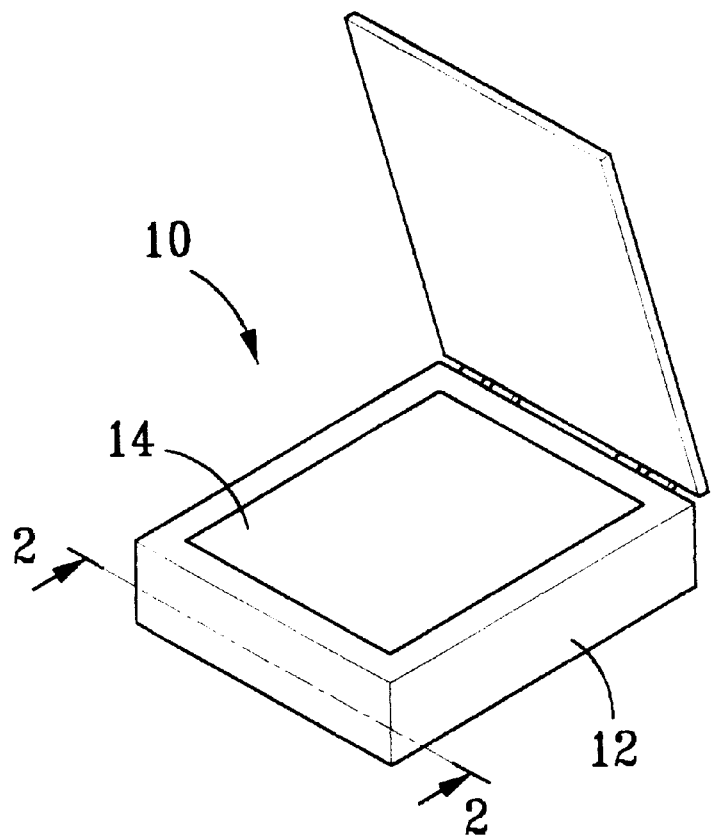
FIG. 1 is a perspective view of a scanning device according to the present invention.
Figure 2:
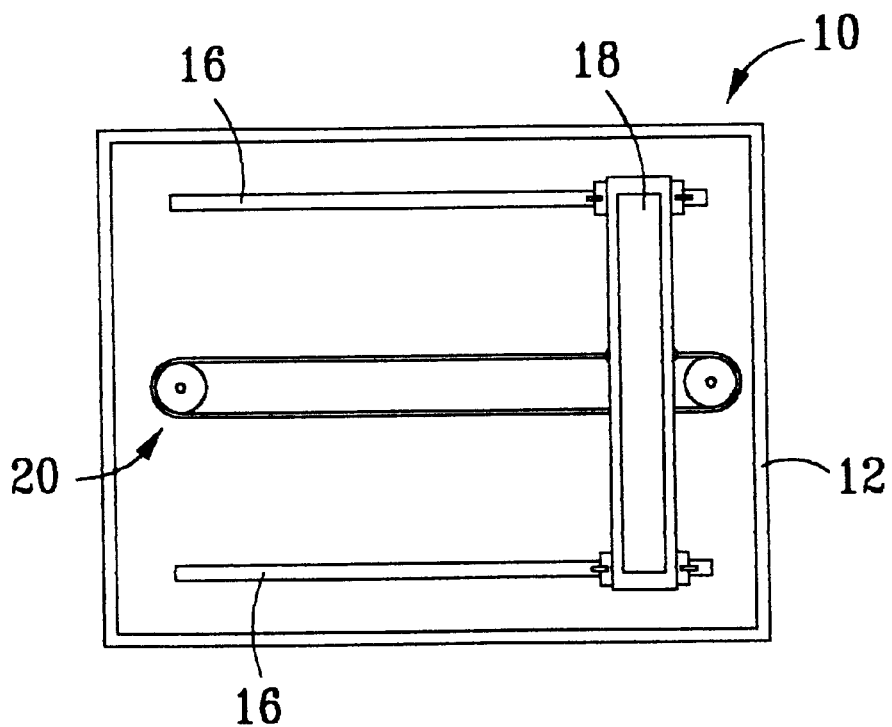
FIG. 2 is a sectional view along line 2—2 of the scanning device shown in FIG. 1.

Please refer to FIGS. 1 and 2. FIG. 1 is a perspective view of the scanning device 10 according to the present invention. FIG. 2 is a sectional view along line 2—2 of the scanning device 10. The scanning device 10 comprises a housing 12 having a transparent platform 14 on its top for placing a document, two parallel tracks 16 installed along a front-and-rear direction below the transparent platform 14 inside the housing 12, a slidable scanning module 18 installed on the two parallel tracks 16 for scanning the document, and a driving device 20 installed inside the housing 12 for driving the scanning module 18 back and forth during scanning of the document. The driving device 20 is a driving mechanism comprising a belt wheel set, a stepping motor and reduction gears(not shown). The belt wheel set comprises a circular belt and two driving wheels. The driving device 20 is installed between the two parallel tracks, and connected to the middle portion of the scanning module to drive the scanning module 18 along the front-and-rear direction.

Figure 3:
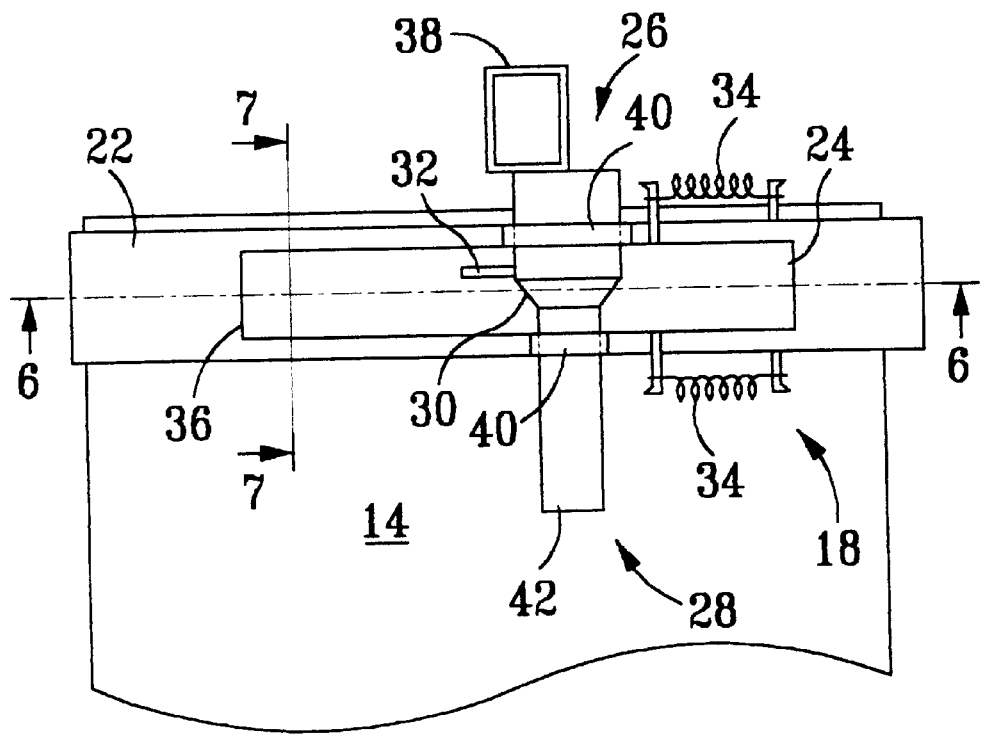
FIG. 3 is a bottom view of the scanning module located at the front end of the housing shown in FIG. 2.
Figure 4:
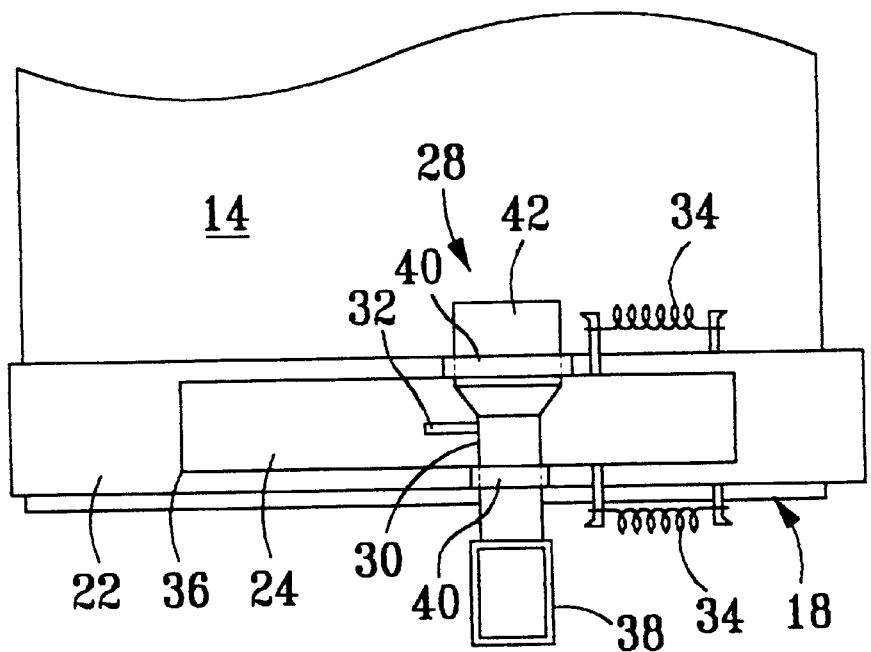
FIG. 4 is a bottom view of the scanning module located at the rear end of the housing shown in FIG. 2.
Figure 5:
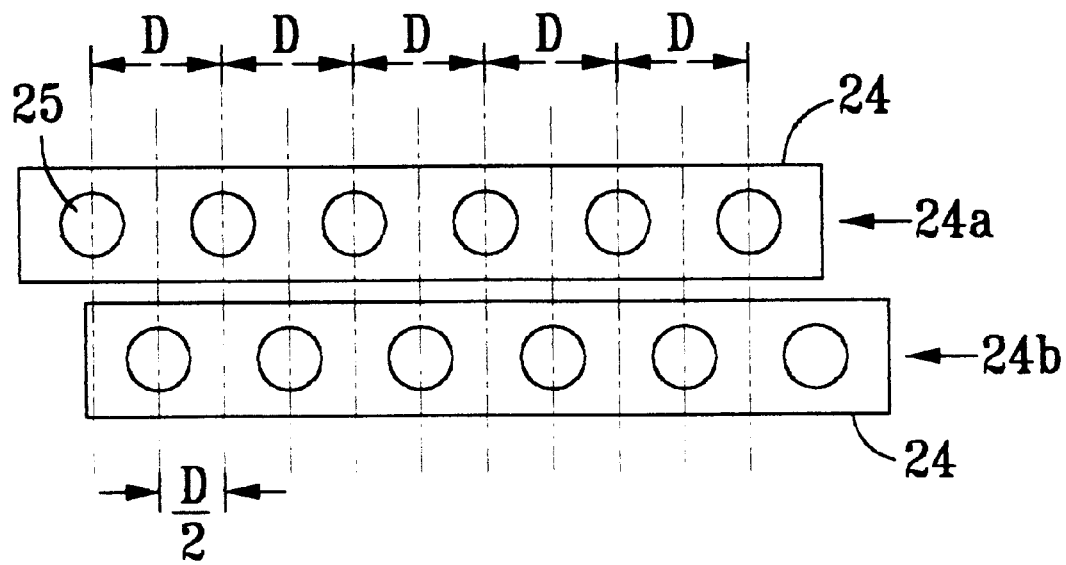
FIG. 5 is a perspective view of different sampling positions of the scanner of the scanning module shown in FIG. 3.
Figure 6:
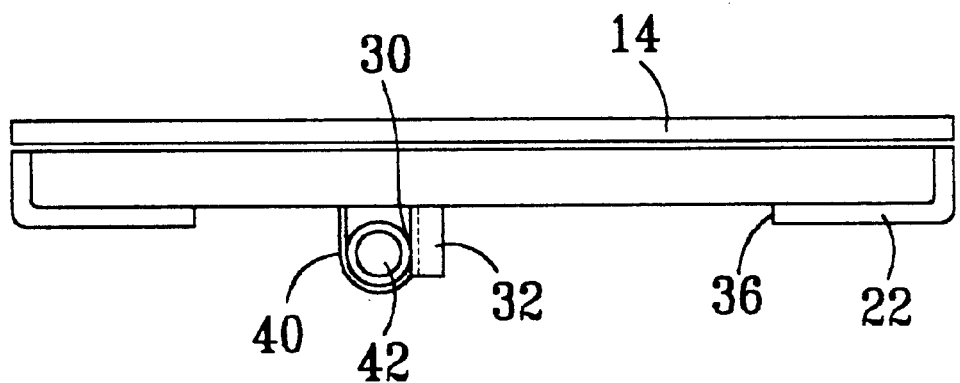
FIG. 6 is a sectional view along line 6—6 of the scanning module shown in FIG. 3.
Figure 7:
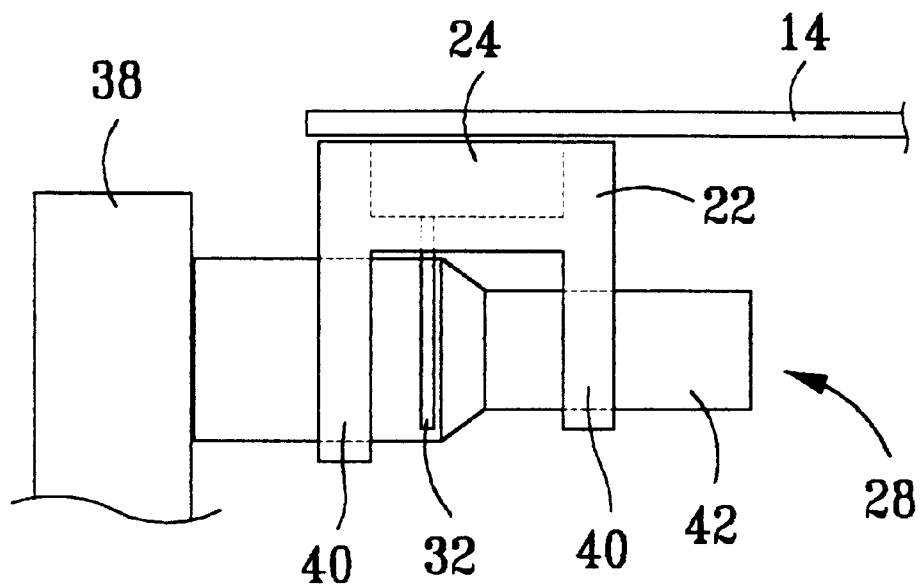
FIG. 7 is a sectional view along line 7—7 of the scanning module shown in FIG. 3.

Please refer to FIG. 3 to FIG. 7. FIG. 3 and FIG. 4 are bottom views of the scanning module 18 as seen from the front end and rear end of the housing 12, respectively. FIG. 5 is a perspective view of different sampling positions of a scanner 24 of the scanning module 18. FIG. 6 is a sectional view along line 6—6 of the scanning module 18. FIG. 7 is a sectional view along line 7—7 of the scanning module 18. The scanning module 18 comprises a plastic carrier 22 and a scanner 24 installed inside the carrier 22. The scanner 24 is slidable along a left-and-right direction. The scanner 24 comprises a set of linearly arranged sampling units 25 for taking document samples. The distance between every two neighboring sampling units 25 defines a gap unit D. All gap units D are of uniform distance. The number of sampling units 25 of the scanner 24 and the gap unit D are determined by the resolution of the scanner 24. The scanning module 18 further comprises a positioning device 26 for fixing the scanner 24 at the first sampling position 24a or the second sampling position 24b inside the carrier 22. The difference between the first and second sampling positions 24a, 24b is half of the gap unit 0.5D. The positioning device 26 comprises a switchable device 28 installed on a bottom side of the carrier 22. The switchable device 28 is slidable along the front-and-rear direction and comprises a positioning side 30, a positioning chip 32 mounted on a bottom side of the scanner 24, and an elastic device 34 installed between the carrier 22 and the scanner 24 for juxtaposing the positioning chip 32 with the positioning side 30 of the switchable device 28. The elastic device 34 comprises two springs installed at a front side and a rear side of the carrier 22 and is used for pulling the positioning chip 32 up against the positioning side 30 of the switchable device 28.

The carrier 22 comprises an opening 36 on its bottom side. The switchable device 28 is installed at the opening 36 of the carrier 22 and is slidable. The positioning chip 32, fixed on the bottom side of the scanner 24, is attached to the positioning side 30 of the switchable device 28 through the opening 36. The switchable device 28 is installed on the carrier 22 and is slidable along the front-and-rear direction. The scanning device 10 further comprises two switch control devices 38 separately installed at a front end (FIG. 3) and a rear end (FIG. 4) of the housing 12 for interacting with the switchable device 28 so as to fix the positioning chip 32 at the first sampling position 24a or the second sampling position 24b of the carrier 22. The switchable device 28 further comprises a sliding rod 42 having two sections with different radii, and two corresponding positioning holes 40 separately installed at front and rear ends of the opening 36. The front and rear ends of the sliding rod 42 are installed on the positioning holes 40 slidable along the front-and-rear direction.

When the scanning module 18 scans the document placed on the transparent platform 14 along the front-and-rear direction, the positioning device 26 will fix the scanner 24 at the first sampling position 24a of the carrier 22. When the first scanning pass is completed (FIG. 4), the rear end of the sliding rod 42 will come in contact with the switch control device 38 at the rear end of the housing 12 causing the sliding rod 42 to be pushed forward. At this time, the positioning chip 32 will cling to the positioning side 30 of the rear section of the sliding rod 42, and the scanner 24 will move to the second sampling position 24b of the carrier 22. Then, the scanning module 18 will scan the document along an opposite direction to complete the scanning process. When the second scanning pass is completed (FIG. 3), the front end of the sliding rod 42 will come in contact with the switch control device 38 at the front end of the housing 12, and the sliding rod 42 will be pushed backward. At this time, the positioning chip 32 will cling to the positioning side 30 of the front section of the sliding rod 42, and the scanner 24 will return to the first sampling position 24a of the carrier 22 to wait for the next scanning command. As shown in FIG. 5, the scanner 24 scans the document at two non-repeating positions, and the difference between the first sampling position 24a and the second sampling position 24b is half of the gap unit D, thus the resolution of the scanning device 10 will be doubled. Basically, the difference between the two sampling positions 24a and 24b is an integer multiple N plus a sampling gap X*D, that is N*D+X*D where X is between 0 and 1. If the sampling gap X*D is half of the gap unit D, then X is 0.5.

Figure 8:
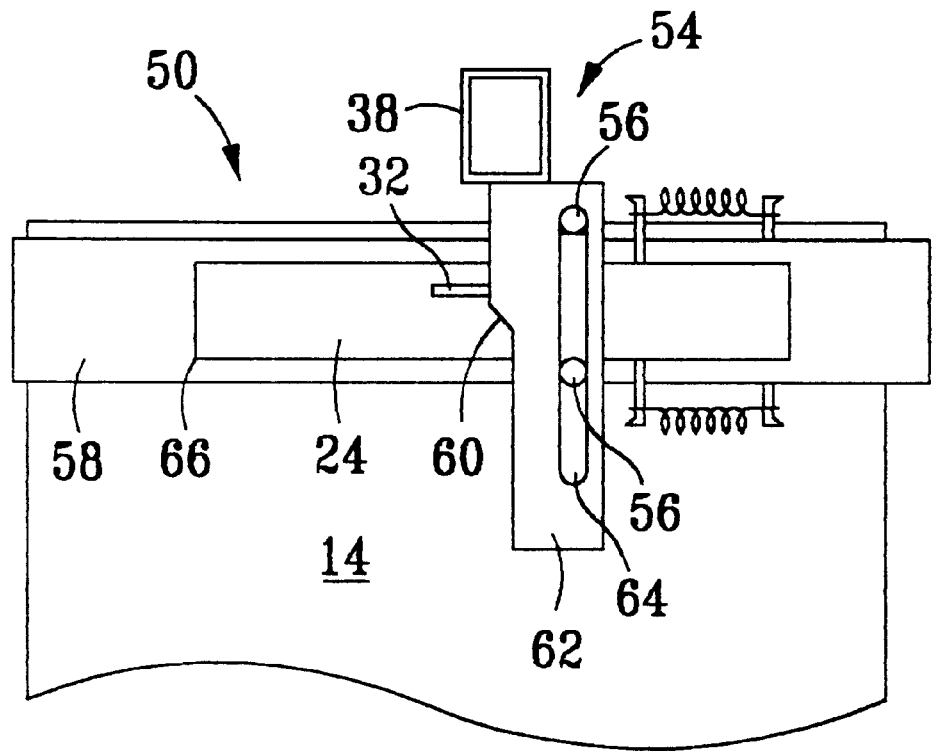
FIG. 8 is a bottom view of an alternative scanning device according to the present invention.

Please refer to FIG. 8. FIG. 8 is a bottom view of an alternative scanning device 50 according to the present invention. The scanning device 50 is similar to the scanning device 10, except for the switchable device 54. The switchable device 54 comprises two protruding knobs 56 installed at front and rear ends of an opening 66 on a bottom side of a carrier 58, and a sliding panel 62 comprising a positioning side 60, and a sliding slot 64 installed around the two protruding knobs 56 slidable along the front-and-rear direction. When the front or rear end of the sliding panel 62 contacts the switch control device 38 at the front or rear end of the housing 12, the sliding panel 62 will be pushed backward or forward, the positioning chip 32 will cling to the front or rear section of the positioning side 60, and the scanner 24 will move to a different sampling position inside the carrier 22.

Figure 9:
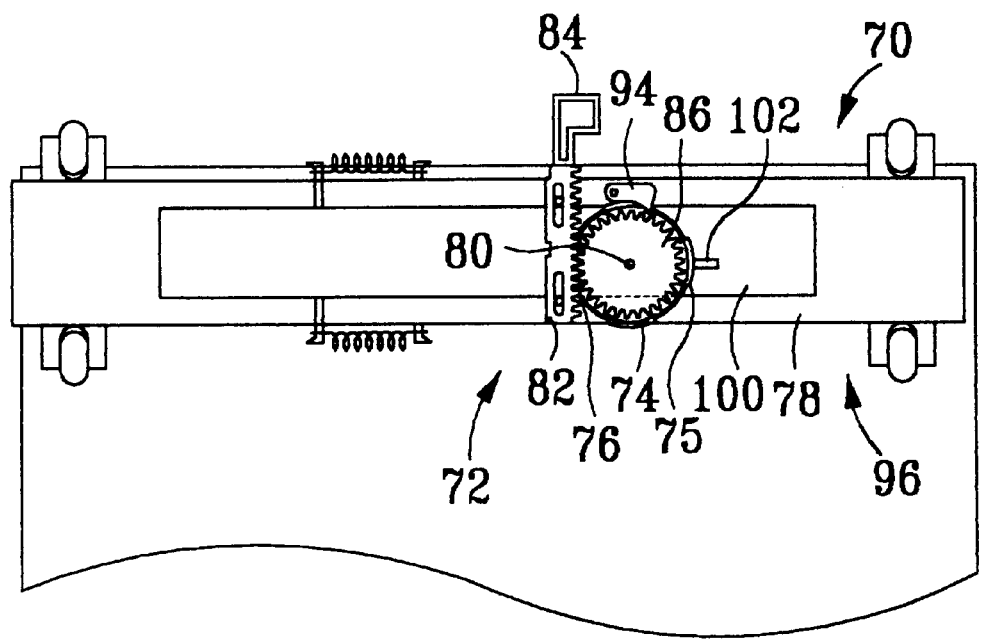
FIG. 9 and FIG. 10 are bottom views of another scanning device which scans in two passes along the same direction according to the present invention.
Figure 10:
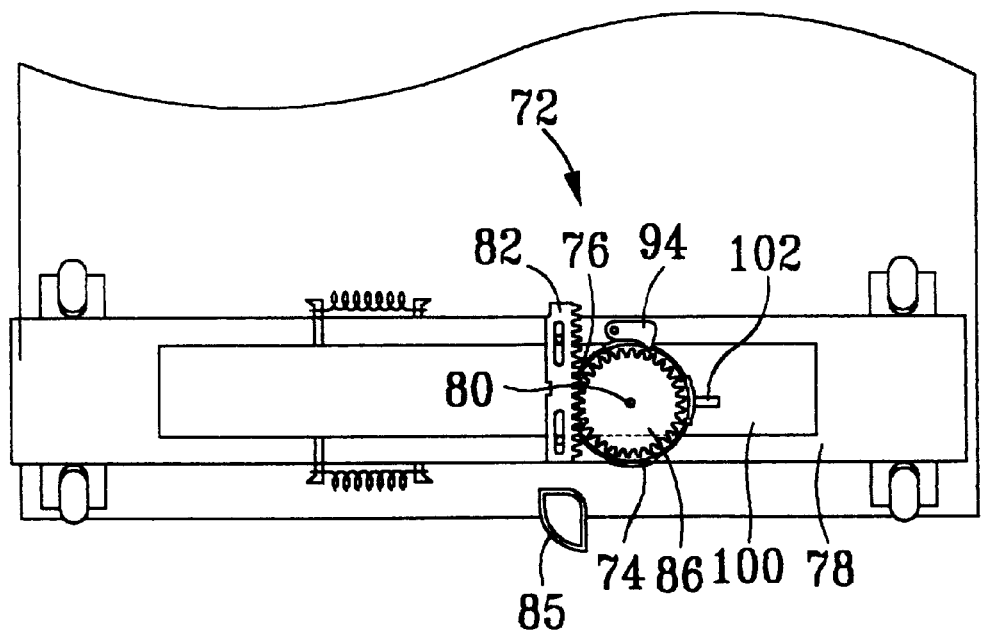
Figure 11:
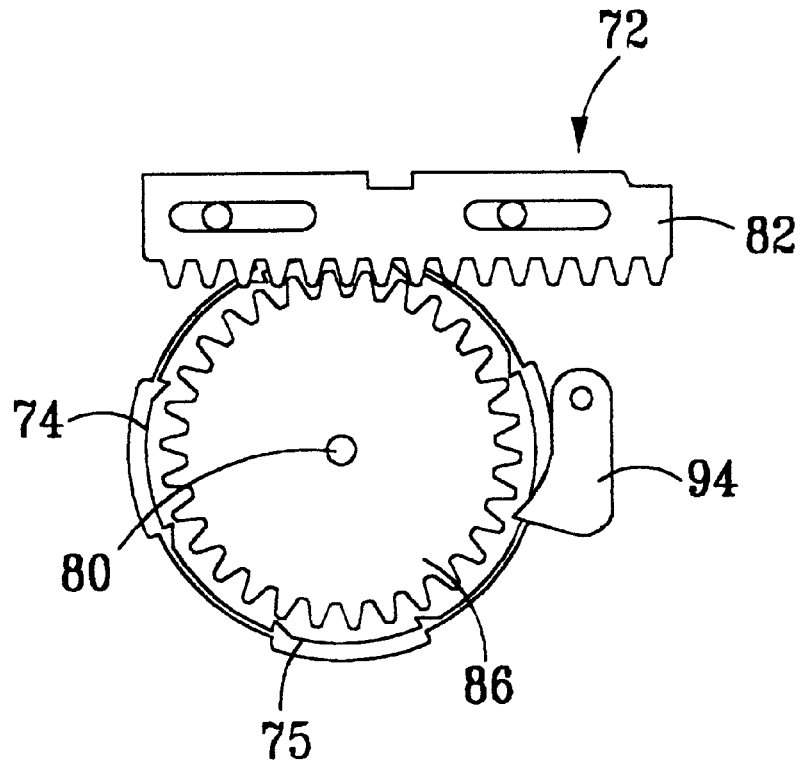
FIG. 11 is a bottom view of the switchable device shown in FIG. 9.
Figure 12:
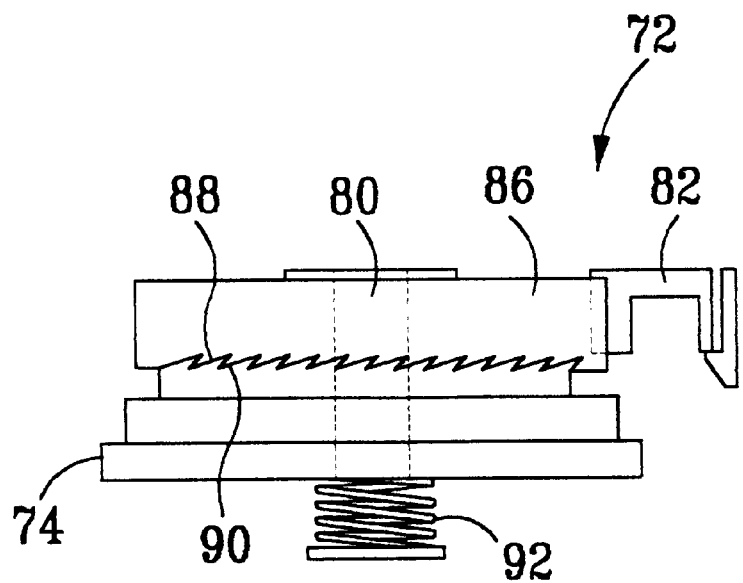
FIG. 12 is a side view of the switchable device shown in FIG. 9.

Please refer to FIG. 9 to FIG. 12. FIG. 9 and FIG. 10 are bottom views of another scanning device 70 which scans in two passes along the same direction according to the present invention. FIG. 11 is a bottom view of the switchable device 72 shown in FIG. 9. FIG. 12 is a side view of the switchable device 72. The scanning device 70 is similar to the scanning devices 10 and 50 of the present invention, except for its switchable device 72 and scanning method.

The switchable device 72 is mounted on a bottom side of a carrier 78. The switchable device 72 comprises a rotatating switching wheel 74 having a pivot 80 mounted on the carrier 78 of the scanning module 96, and a periphery 75 with two different radii functioning as a positioning side 75. The difference between the two radii is an integer multiple of the gap unit D as shown in FIG. 5 plus half of the gap unit D, that is N×D+0.5D.

The switchable device 72 further comprises a serrated panel 82 mounted on the carrier 78 slidable along the front-and-rear direction for driving the switching wheel 74. The scanning device 70 comprises two switch control devices 84 and 85 installed at the front and rear ends of the housing 12 for interacting with the front and rear ends of the serrated panel 82 so as to push the serrated panel 82 backward and forward. The switchable device 72 further comprises a driving gear 86 in contact with the serrated panel 82 for driving the switching wheel 74. The driving gear 86 and the switching wheel 74 are both rotatably mounted on the same pivot 80. The driving gear 86 and switching wheel 74 each comprises a ratchet 88, 90 through which they may engage. The ratchet 88 of the driving gear 86 can only drive the ratchet 90 of the switching wheel 74 in a clockwise direction. The switchable device 72 further comprises a spring 92 installed on the pivot 80 of the driving gear 86 for pushing the switching wheel 74 toward the driving gear 86 so that the ratchet 88 of the driving gear 86 is in close contact with the ratchet 90 of the switching wheel 74 or for holding the switching wheel 74 when it is pushed away by the driving gear 86. The switchable device 72 further comprises a tenon 94 mounted on the carrier 78 for preventing the switching wheel 74 from rotating in a counterclockwise direction.

The scanning device 70 requires two scanning passes to double its resolution. In the first unidirectional scanning pass, the positioning side 75 of the switchable device 72 will fix the positioning chip 102 mounted below the scanner 100 at the first sampling position inside the carrier 78. When the scanning module 96 moves to the rear end of the housing 12, the rear end of the serrated panel 82 will come in contact with the switch control device 85 at the rear end of the housing 12 causing the serrated panel 82 to be pushed forward thus becoming engaged with the driving gear 86. This will cause clockwise rotation of the driving gear 86 and the switching wheel 74 along with the positioning side 75 of the switching wheel 74. Therefore, the positioning chip 102 at the bottom of the scanner 100 will cling to the next section of the positioning side 75, and the scanner 100 will move to the second sampling position of the carrier 78. When the scanning module 96 moves to the front end of the housing 12, the front end of the serrated panel 82 will come in contact with the switch control device 84 at the front end of the housing 12, and the serrated panel 82 will be pushed backward. This will rotate the driving gear 86 in a counter-clockwise direction. The counterclockwise movement will separate the ratchet 90 of the switching wheel 74 away from the ratchet 88 of the driving gear 86 because the tenon 94 blocks the counterclockwise movement of the switching wheel 74. Thus, the scanner 100 will be maintained at the second sampling position inside the carrier 78. After the second unidirectional scanning pass, the switchable device 72 will move the positioning chip 102 to the following section of the positioning side 75 which is the same as the first sampling position. Because the scanner 100 makes two scanning passes over the first and second sampling positions, the resolution of the scanning device 70 will double the resolution of the scanner 100.

Figure 13:
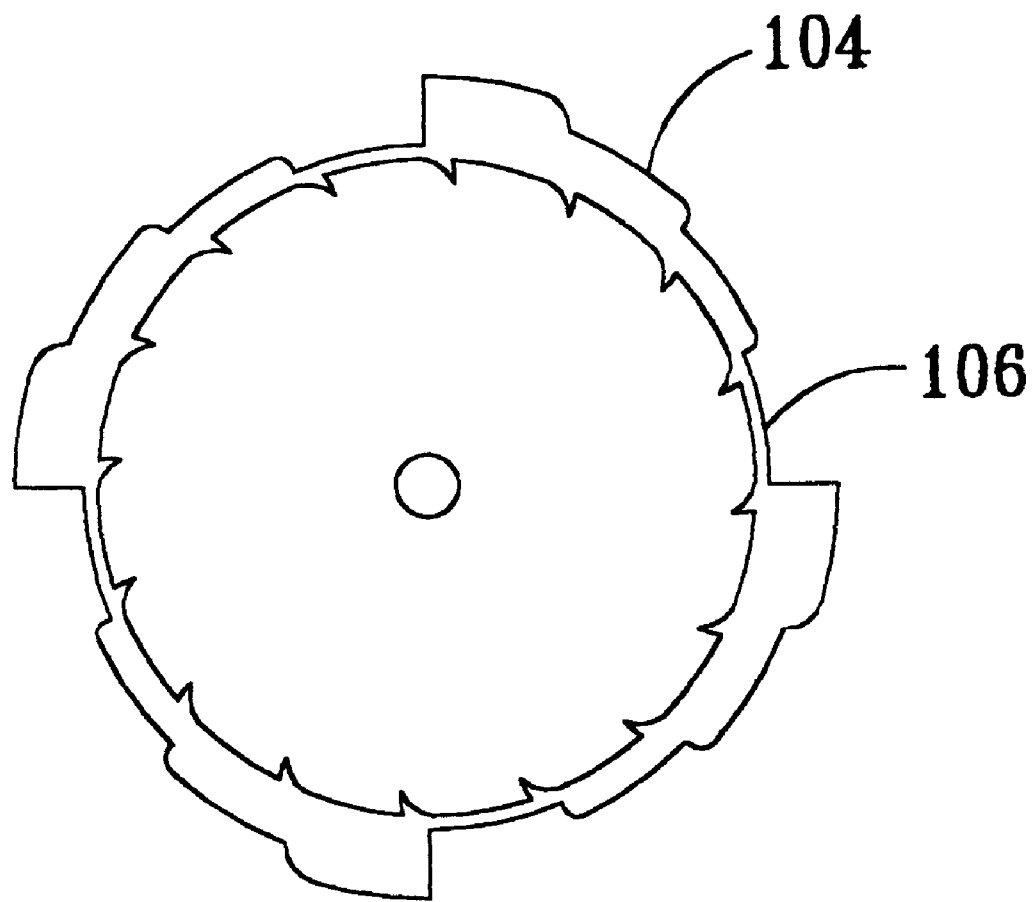
FIG. 13 is a bottom view of an alternative switching wheel shown in FIG. 11.

Please refer to FIG. 13. FIG. 13 is a bottom view of an alternative switching wheel 104 of the switchable device 72 shown in FIG. 11. The switching wheel 104 comprises a positioning side 106 having a variety of peripheral sections with four different radii. The difference between the radii of every two neighboring peripheral sections is an integer multiple of the gap unit D plus a quarter of the gap unit D. Whenever the scanning module 96 completes a unidirectional scanning pass, the positioning chip 102 will engage with the next peripheral section of the switching wheel 104, and the scanner 100 will move to a different sampling position inside the carrier 78. Because the scanning module 96 scans the document at four different sampling positions (i.e. the first, second, third and fourth sampling positions) in four scanning passes, and the difference between every two neighboring sampling positions is an integer multiple of the gap unit D plus a quarter of the gap unit D, the resolution of the scanning device 70 will be quadrupled.

Figure 14:
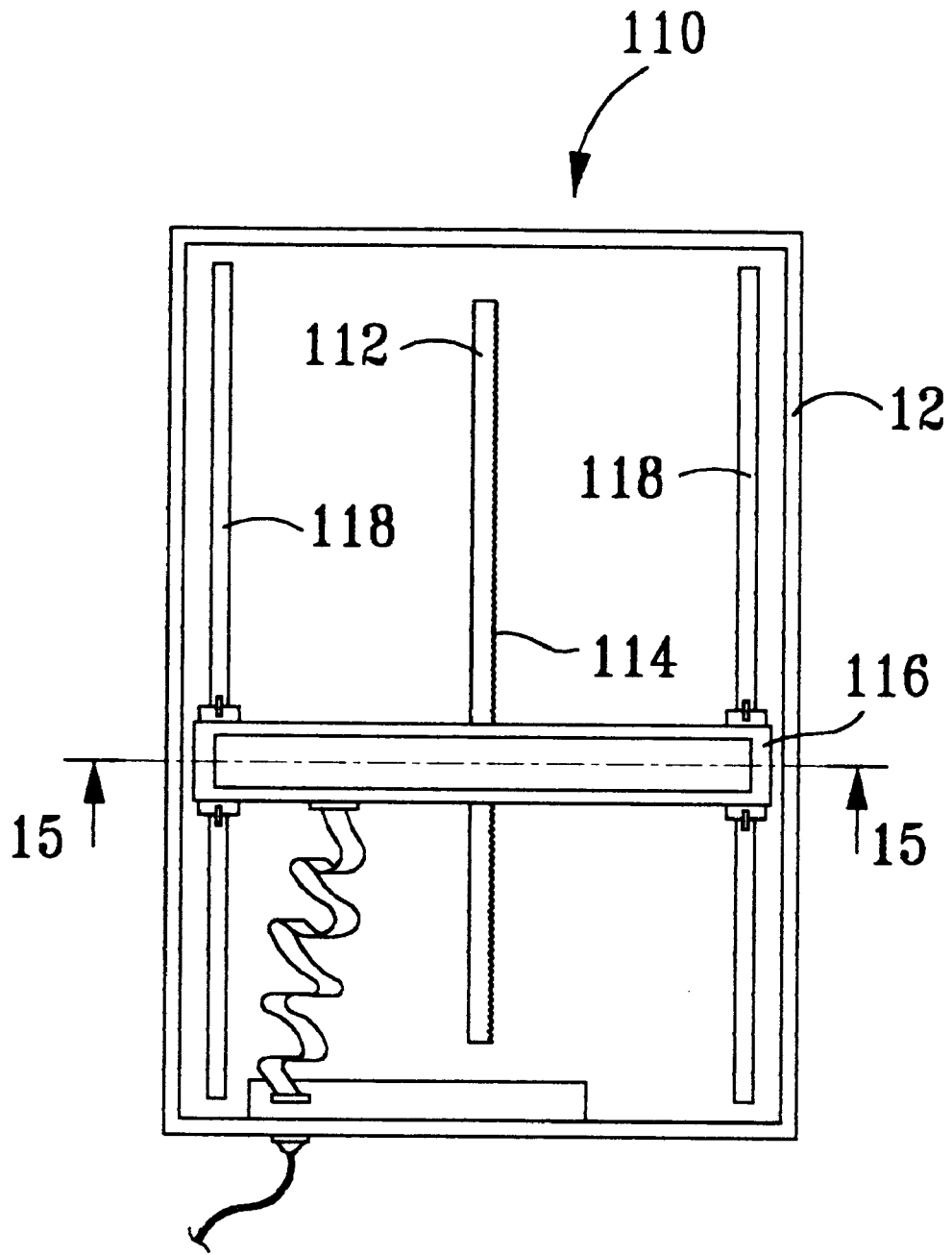
FIG. 14 is a sectional view of another flatbed scanning device according to the present invention.
Figure 15:
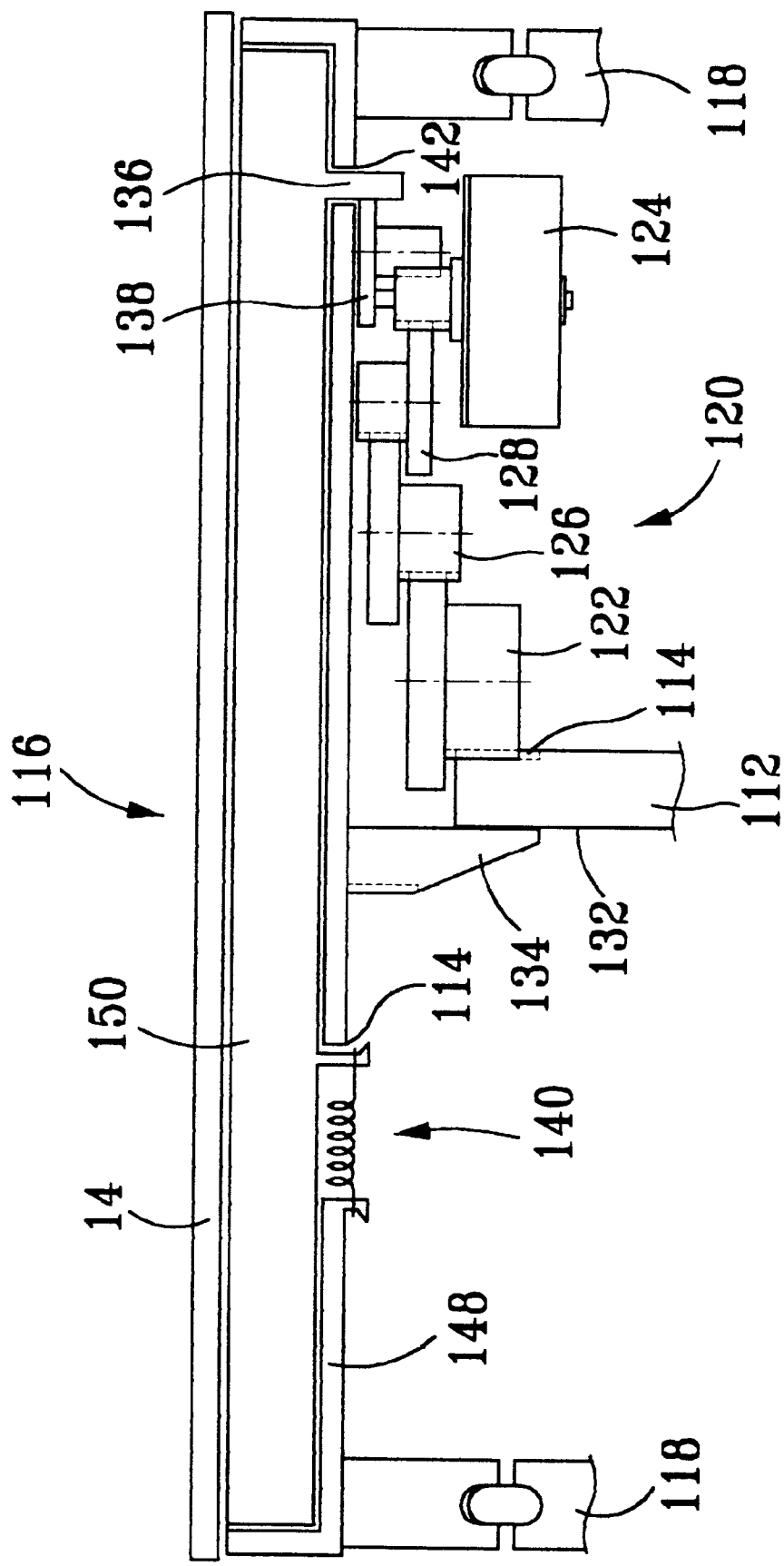
FIG. 15 is a sectional view along line 15—15 of the scanning module of the scanning device shown in FIG. 14.
Figure 16:
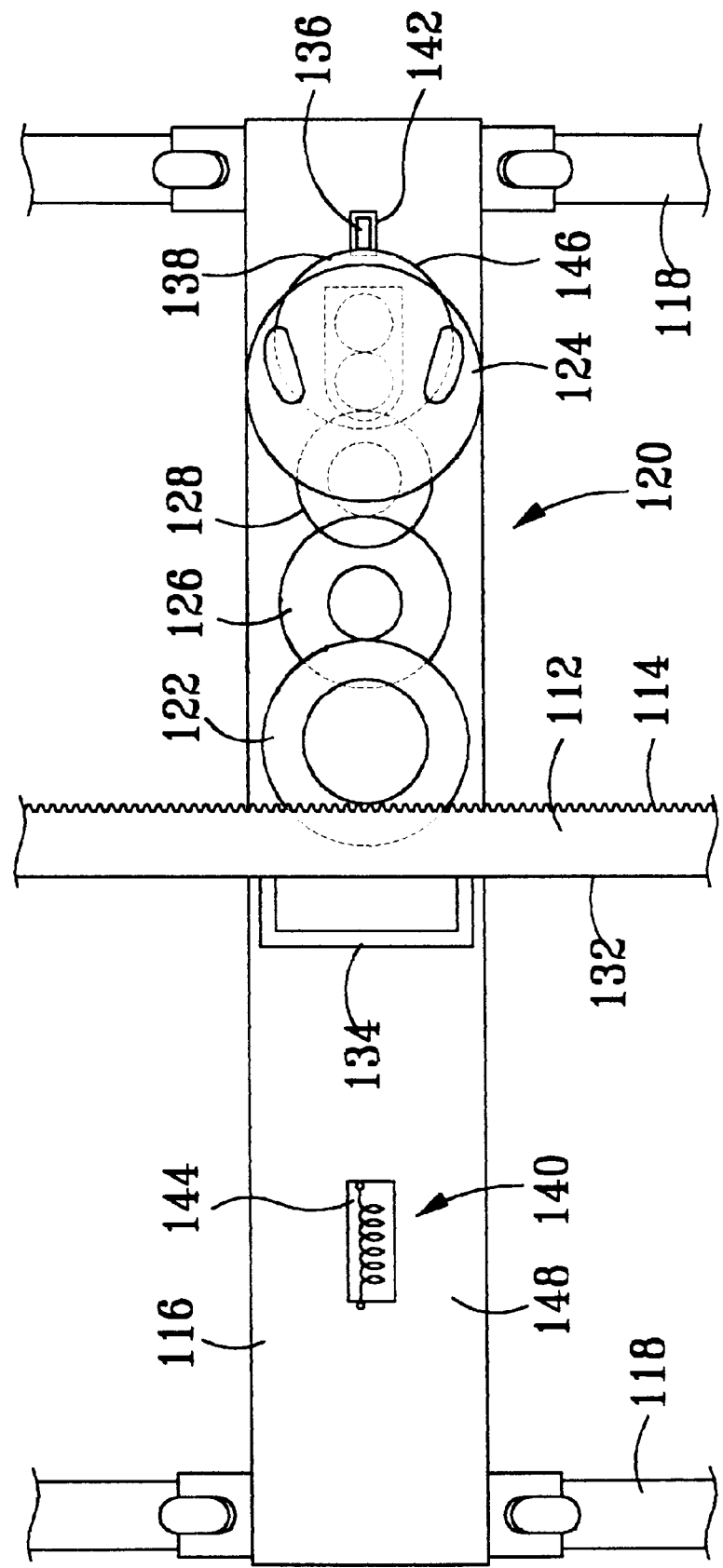
FIG. 16 is a bottom view of the scanning module shown in FIG. 15.
Figure 17:
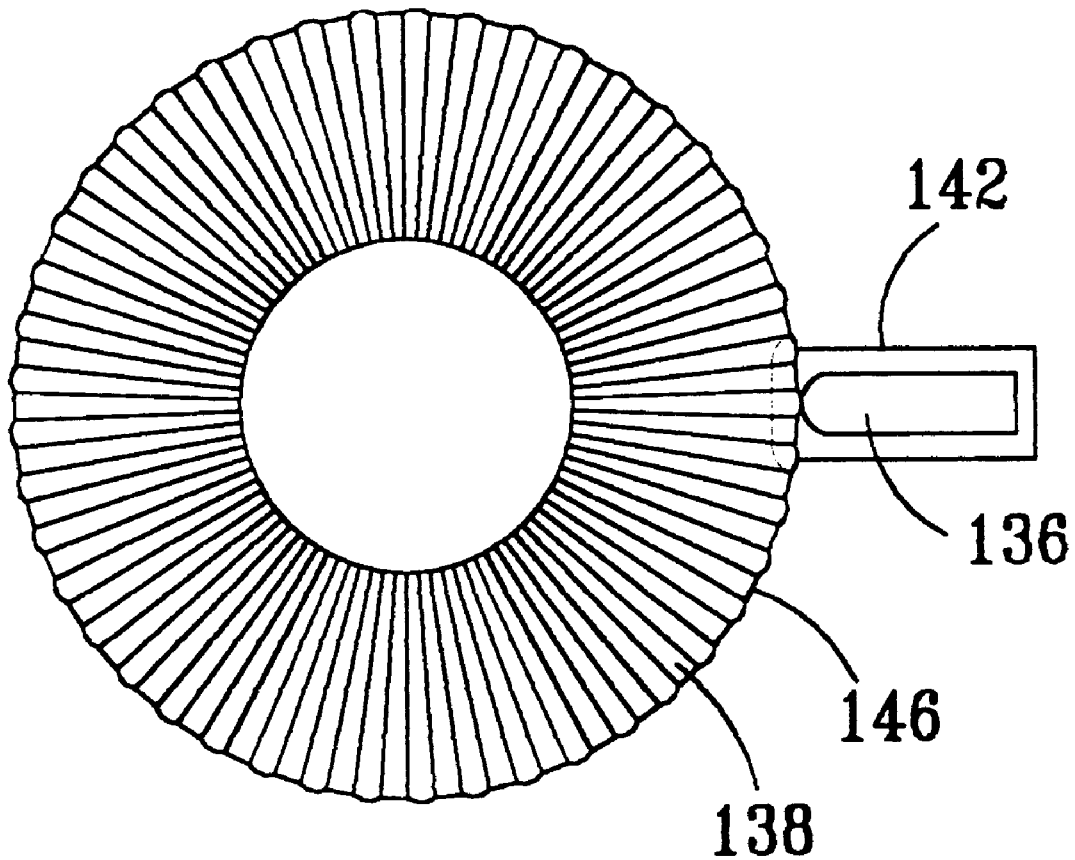
FIG. 17 is a bottom view of the positioning chip and switching wheel of the scanning module shown in FIG. 15.

Please refer to FIGS. 14 to 17. FIG. 14 is a sectional view of another flatbed scanning device 110. FIG. 15 is a sectional view along line 15—15 of a scanning module 116 of the scanning device 110 shown in FIG. 14. FIG. 16 is a bottom view of the scanning module 116. FIG. 17 is a bottom view of a positioning chip 136 and switching wheel 138 of the scanning module 116.

The scanning device 110 comprises a housing 12 having a protruding ridge 112 installed along a front-and-rear direction on the bottom of the housing 12, two parallel track mechanisms 118 installed on left and right sides of the housing 12, and a self-driven slidable scanning module 116 installed on the two parallel track mechanisms 118 of the housing 12. The protruding ridge 112 comprises a vertical serrated surface 114 on one side, and a flat surface 132 on the other side in parallel with the serrated surface 114.

The scanning module 116 comprises a driving device 120 installed on its bottom side. The driving device 120 comprises a horizontally rotating gear wheel 122 in contact with the protruding ridge 112, and a stepping motor 124 installed below the scanning module 116 for driving two reduction gears 126 and 128 to rotate the gear wheel 122 and drive the scanning module 116. The scanning module 116 further comprises a supporting arm 134 installed on its bottom side for slidably engaging the flat surface 132 of the protruding ridge 112. The protruding ridge 112 is thus clamped between the supporting arm 134 of the scanning module 116 and the gear wheel 122 of the driving device 120. The gear wheel 122 will thereby maintain close contact with the serrated surface 114 as it rolls along this serrated surface 114.

The scanning module 116 further comprises a plastic carrier 148, a scanner 150 installed inside the carrier 148, a rotating switching wheel 138 mounted below the carrier 148 having a positioning side 146, and an elastic device 140 installed on the other opening 144 on the bottom side of the carrier 148. The scanner 150 is installed within the carrier 148 and is slidable along a left-right direction. The scanner 150 also contains a positioning chip 136 which is mounted on the bottom side of the scanner 150 and which protrudes out of an opening 142 on the bottom side of the carrier 148. The elastic device 140 is used for elastically fixing the positioning chip 136 of the scanner 150 to the positioning side 146 of the switching wheel 138. This serves to fix the scanner 150 at different sampling positions inside the carrier 148. The positioning side 146 of the switching wheel 138 comprises a variety of peripheral sections of two different radii. The difference between the two radii is an integer multiple of the gap unit D plus half of the gap unit D, that is N*D+0.5D, thus the positioning side 146 can fix the scanner 150 at two non-repeating sampling positions inside the carrier 148.

The switching wheel 138 of the scanning module 116 is connected above and is driven by the stepping motor 124. During a scanning operation, the stepping motor 124 will use the reduction gears 126 and 128 to drive the gear wheel 122. This will cause the scanning module 116 to move forward and backward and will simultaneously rotate the switching wheel 138 so that the scanner 150 can scan the document at the two non-repeating sampling positions inside the carrier 148. As the scanning module 116 progresses step by step, the switching wheel 138 is rotated section by section, and the two sampling positions alternate continuously over the length of the document. For example, if the resolution of the scanner 150 is 300 dpi (dots per inch), the stepping motor 124 moves 600 steps per inch as the scanner 150 takes samples from the document at each step. By taking samples from two different positions inside the carrier 148, the scanner 150 will generate two digital images with a resolution of 300 dpi each. These two 300 dpi digital images are combined thus generating a digital image of 600 dpi. The resolution of the scanning module 116 is thereby doubled.

The described method can also be used to decrease the resolution of the scanning module 116. If the scanner 150 takes a sample every two steps, the resolution of the scanning module 116 will be maintained at 300 dpi. If the scanner 150 takes a sample every four steps, and a computer is coordinated to decrease the resolution of the generated digital image to one half, the resolution of the scanning module 116 will be reduced to 150 dpi. Additionally, if the positioning side 146 of the switching wheel 138 is created with more than two different radii according to the method shown in FIG. 13, the resolution of the scanning module 116 will be further increased. The major difference between the scanning device 110 with the aforementioned scanning devices 10, 50, and 70 is that the scanning module 116 only requires a single unidirectional scanning pass to complete a high resolution scanning process whereas the scanning devices 10, 50, 70 require at least two scanning passes, thus the scanning device 110 is a more time efficient scanning device.

Those skilled in the art will readily observe that numerous modifications and alterations of the propeller may be made while retaining the teachings of the invention. Accordingly, the above disclosure should be construed as limited only by the metes and bounds of the appended claims.

What is claimed is:

1. A scanning device comprising:
   a housing having a transparent platform installed on its top for placing a document;
   a scanning module installed inside the housing slidable along a front-and-rear direction for scanning the document, the scanning module comprising:
      a carrier;
      a sensor installed inside the carrier slidable along a left-right direction, the sensor comprising a plurality of sensing units linearly arranged along a left-right direction for taking image samples of the document; and
      a positioning device for fixing the sensor inside the carrier comprising:
         a switchable device installed on the carrier having a positioning side;
         a positioning chip installed on the sensor; and
         an elastic device installed between the carrier and the sensor for pulling the positioning chip of the sensor toward the positioning side of the switchable device; and
   a driving device for driving the scanning module forward and backward to scan the document;
   wherein when the scanning module scans the document along the front-and-rear direction, the positioning side of the switchable device fixes the positioning chip of the positioning device at non-repeating sampling positions inside the carrier to increase the resolution of the sensor.

2. The scanning device of claim 1 wherein the carrier comprises an opening and the positioning chip of the sensor is extended through the opening and pulled toward the positioning side of the switchable device which is installed at the opening.

3. The scanning device of claim 2 wherein the elastic device is mounted between the sensor and the carrier over the opening for pulling the positioning chip of the sensor toward the positioning side of the switchable device.

4. The scanning device of claim 1 wherein the elastic device comprises two springs mounted on front and rear sides of the carrier for pulling the positioning chip toward the positioning side of the switchable device.

5. The scanning device of claim 1 wherein the distance between every two neighboring sensing units defines a gap unit and the distance between two non-repeating sampling positions is an integer multiple of the gap unit plus a sampling gap which is less than the gap unit.

6. The scanning device of claim 5 wherein the sampling gap is approximately equal to one half of the gap unit.

7. The scanning device of claim 1 wherein the switchable device is installed on the carrier and slidable along a front-and-rear direction, and the scanning device further comprises at least one switch control device installed inside the housing for interacting with the switchable device so that the positioning side of the switchable device is moved to fix the positioning chip at non-repeating sampling positions inside the carrier.

8. The scanning device of claim 7 wherein the switchable device comprises two protruding knobs installed on the carrier along the front-and-rear direction, and a sliding panel having a positioning side and a sliding slot mounted over the two protruding knobs slidable along the front-and-rear direction, and wherein the scanning device comprises two switch control devices installed at front and rear ends of the housing, wherein when the sliding panel contacts the switch control device at the front or rear end of the housing, the sliding panel is pushed backward or forward and the positioning side is moved to fix the positioning chip at a non-repeating sampling position inside the carrier.

9. The scanning device of claim 7 wherein the switchable device comprises two mounting holes built on the carrier along the front-and-rear direction, and a sliding rod having the positioning side built on one side and mounted inside the two mounting holes slidable along the front-and-rear direction, and wherein the switchable device comprises two switch control devices installed at the front and rear ends of the housing separately, wherein when the sliding rod contacts the switch control device at the front or rear end of the housing, the sliding rod is pushed backward or forward and the positioning side is moved to fix the positioning chip at a non-repeating sampling position inside the carrier.

10. The scanning device of claim 1 wherein the switchable device comprises a switching wheel pivotally mounted on the carrier with the positioning side installed at the periphery of the switching wheel.

11. The scanning device of claim 10 wherein the positioning side of the switching wheel comprises a plurality of peripheral sections with different radii for fixing the positioning chip of the sensor at non-repeating sampling positions inside the carrier.

12. The scanning device of claim 11 wherein the distance between two neighboring sensing units of the sensor defines a gap unit, and the difference between the radii of two neighboring peripheral sections is an integer multiple of the gap unit plus a sampling gap which is less than the gap unit.

13. The scanning device of claim 11 wherein for each scanning pass, the positioning chip clings to a peripheral section of different radius so that the positioning chip is fixed at a non-repeating sampling position inside the carrier.

14. The scanning device of claim 13 wherein the switchable device further comprises a driver mounted on the carrier slidable along the front-and-rear direction for rotating the switching wheel, and wherein the scanning device comprises at least one switch control device installed inside the housing for interacting with the driver wherein when the scanning module is moved to the switch control device, the driver interactes with the switch control device and rotate the switching wheel, and the positioning side of the switching wheel thus moves the positioning chip and fixes the sensor at a non-repeating sampling position.

15. The scanning device of claim 14 wherein the scanning device comprises two switch control devices installed at front and rear ends of the housing wherein when the scanning module is moved to the front or rear ends of the housing, the front or rear switch control devices pushes the driver to rotate the switching wheel so that the positioning chip of the sensor is fixed at a non-repeating sampling position inside the carrier.

16. The scanning device of claim 15 wherein the driver comprises a serrated panel and the switchable device further comprises a driving gear which is in contact with the serrated panel of the driver and pivotally mounted above the switching wheel for driving the switching wheel along a predetermined direction wherein when the scanning module is moved to the front or rear end of the housing, the front or rear switch control device pushes the driver to rotate the driving gear and the switching wheel is rotated by the driving gear only along the predetermined direction.

17. The scanning device of claim 10 wherein the scanning module comprises a stepping motor installed on the carrier for rotating the switching wheel so as to fix the positioning chip at various non-repeating sampling positions inside the carrier.

18. The scanning device of claim 10 wherein the driving device is installed on the scanning module and comprises a roller wheel mounted on the carrier and rotatably in contact with the housing and a stepping motor mounted on the carrier for driving the roller wheel to move the scanning module forward and backward.

19. The scanning device of claim 18 wherein the stepping motor is also used to drive the switching wheel simultaneously so that when the scanning module is driven by the stepping motor to scan the document, the sensor is also positioned at various non-repeating sampling positions by the stepping motor to increase its resolution.

20. A scanning device comprising:
 a housing having a transparent platform installed on its top for placing a document;
 a scanning module installed inside the housing slidable along a front-and-rear direction for scanning the document, the scanning module comprising:
  a carrier;
  a sensor installed inside the carrier slidable along a left-right direction, the sensor comprising a plurality of sensing units linearly arranged along a left-right direction for taking image samples of the document; and
  a positioning device for fixing the sensor inside the carrier; and
 a driving device for driving the scanning module forward and backward to scan the document;
 wherein when the scanning module scans the document along the front-and-rear direction, the positioning device fixes the plurality of sensing units of the sensor at non-repeating sampling positions inside the carrier such that the position of each sensing unit inside the carrier in a forward pass is different from that in a backward pass so as to increase the resolution of the sensor.

21. A scanning device comprising:
 a housing having a transparent platform installed on its top for placing a document;
 a scanning module installed inside the housing slidable along a front-and-rear direction for scanning the document, the scanning module comprising:
  a carrier;
  a sensor installed inside the carrier slidable along a left-right direction, the sensor comprising a plurality of sensing units linearly arranged along a left-right direction for taking image samples of the document; and
  a positioning device for fixing the sensor inside the carrier; and
 a driving device for driving the scanning module forward and backward to scan the document;
 wherein when the scanning module scans the document along the front-and-rear direction, the positioning device fixes the plurality of sensing units of the sensor at non-repeating sampling positions inside the carrier such that the position of each sensing unit inside the carrier alternates along a left-right direction as the scanning module moves along the front-and-rear direction step by step so as to increase the resolution of the sensor.

* * * * *